United States Patent [19]
Pool

[11] 3,825,138
[45] July 23, 1974

[54] UNLOADER FOR THE GRAIN BIN OF A COMBINE

[75] Inventor: Stuart D. Pool, Crystal Lake, Ill.

[73] Assignee: Bernard C. Mathews, Crystal Lake, Ill.

[22] Filed: Oct. 24, 1972

[21] Appl. No.: 299,825

Related U.S. Application Data

[52] U.S. Cl............. 214/522, 214/83.26, 198/64, 198/213
[51] Int. Cl............................................. B60p 1/42
[58] Field of Search ........... 214/519, 520, 521, 522, 214/83.32; 198/213, 64; 56/13.5; 212/413, 254

[56] References Cited
UNITED STATES PATENTS

| | | | |
|---|---|---|---|
| 2,730,256 | 1/1956 | Laden et al. | 214/522 |
| 2,877,914 | 3/1959 | Herk | 214/522 |
| 3,108,703 | 10/1963 | Horne et al. | 214/522 |
| 3,339,758 | 9/1967 | Hubert et al. | 214/522 X |
| 3,720,052 | 3/1973 | Anderson et al. | 214/521 |

*Primary Examiner*—Albert J. Makay
*Attorney, Agent, or Firm*—Bayard Jones

[57] ABSTRACT

An unloader for the grain bin of a combine comprises a vertical auger conveyor extending upwardly from the grain bin, and a swinging boom assembly mounted on top of the vertical auger conveyor. The boom assembly including a substantially horizontally disposed auger conveyor and a turret. The vertical auger shaft extends upwardly through and beyond the turret which overlies the vertical auger conveyor. A propeller shaft is disposed externally of the horizontal auger conveyor for driving the horizontal auger shaft from its remote end. A gear assembly located above the turret connects the vertical auger shaft, the external propeller shaft, and a power shaft so that the driving mechanism is located externally of the path of the grain flow through the two conveyors. An additional extension auger conveyor is provided for loading a trailer.

10 Claims, 12 Drawing Figures

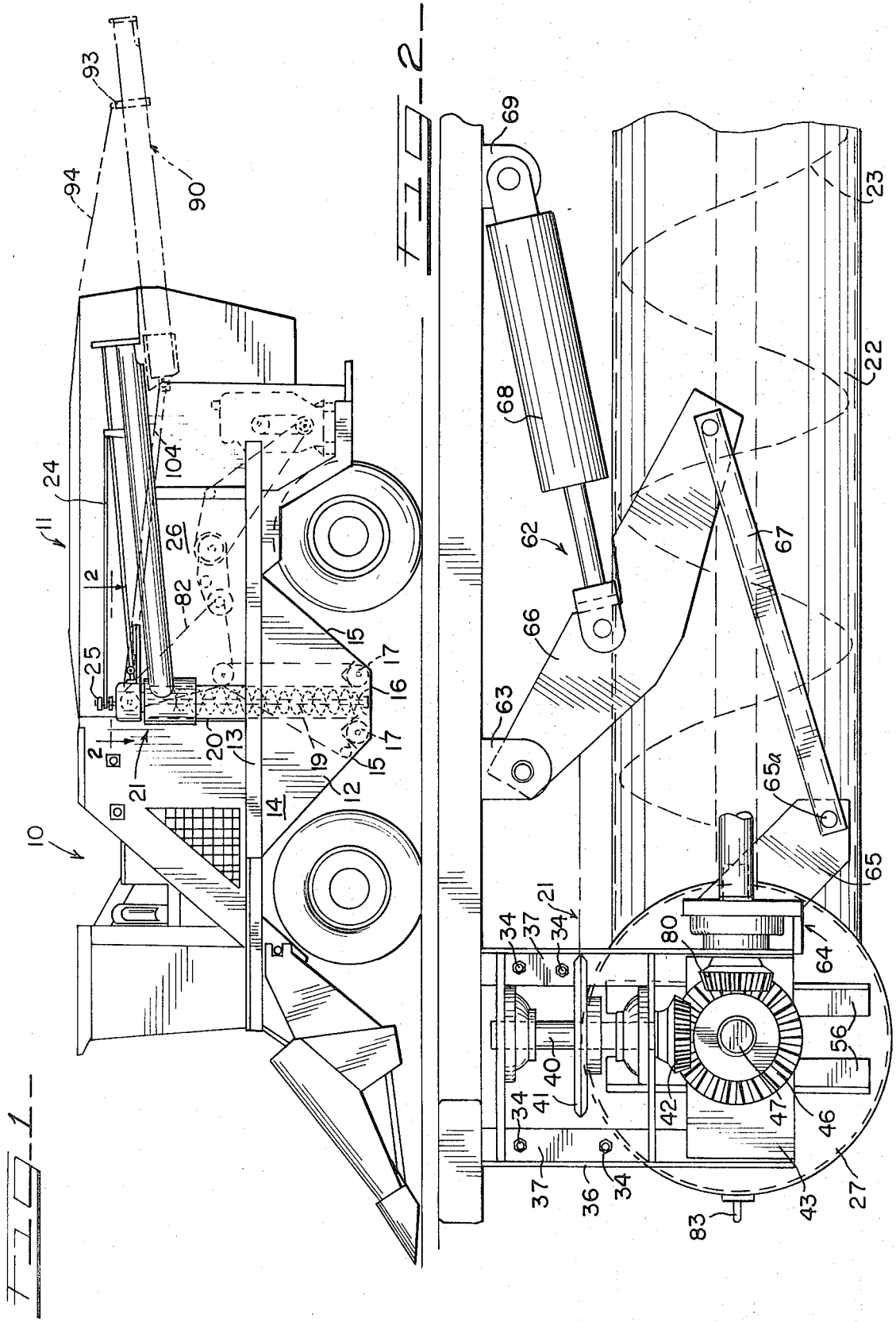

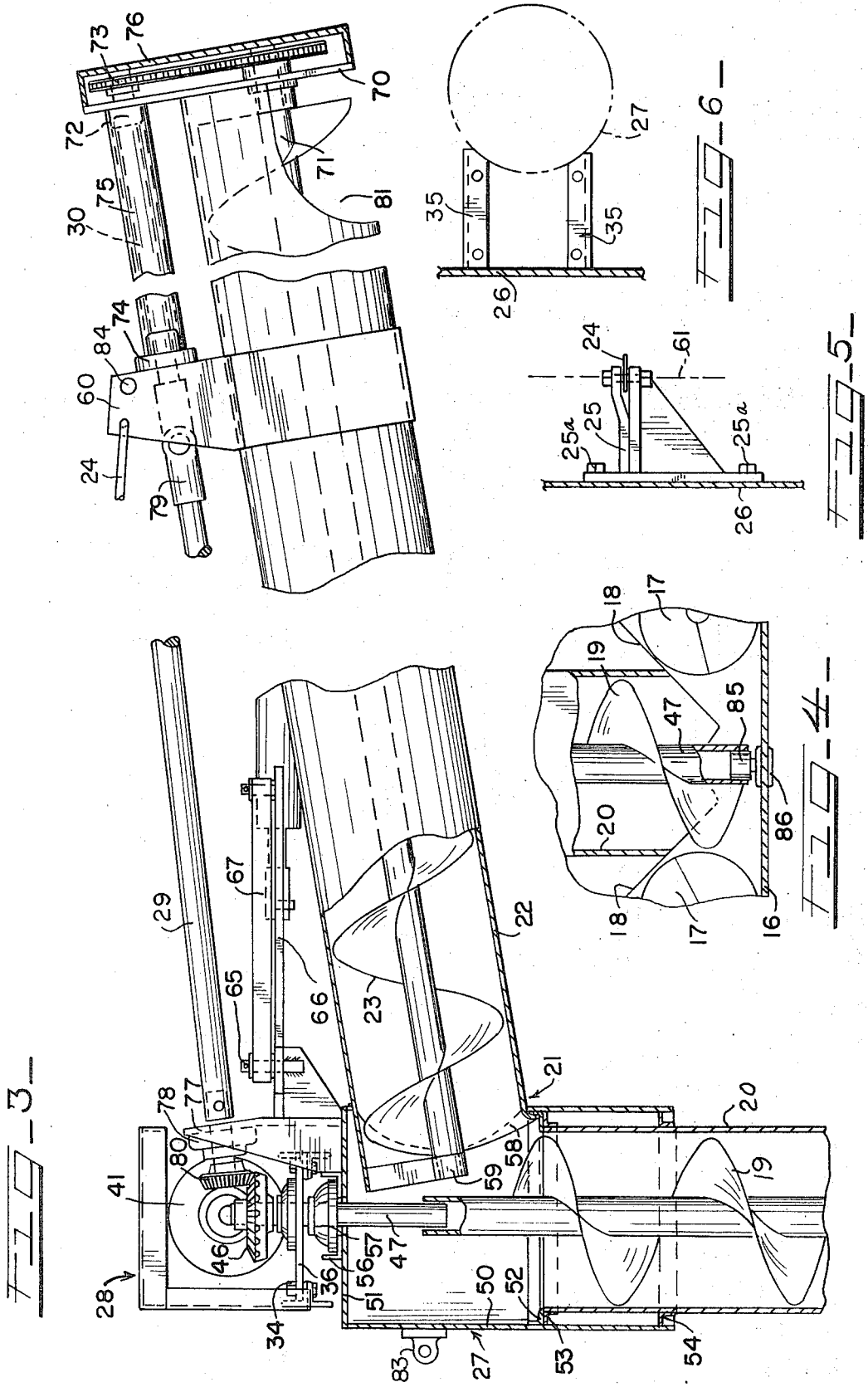

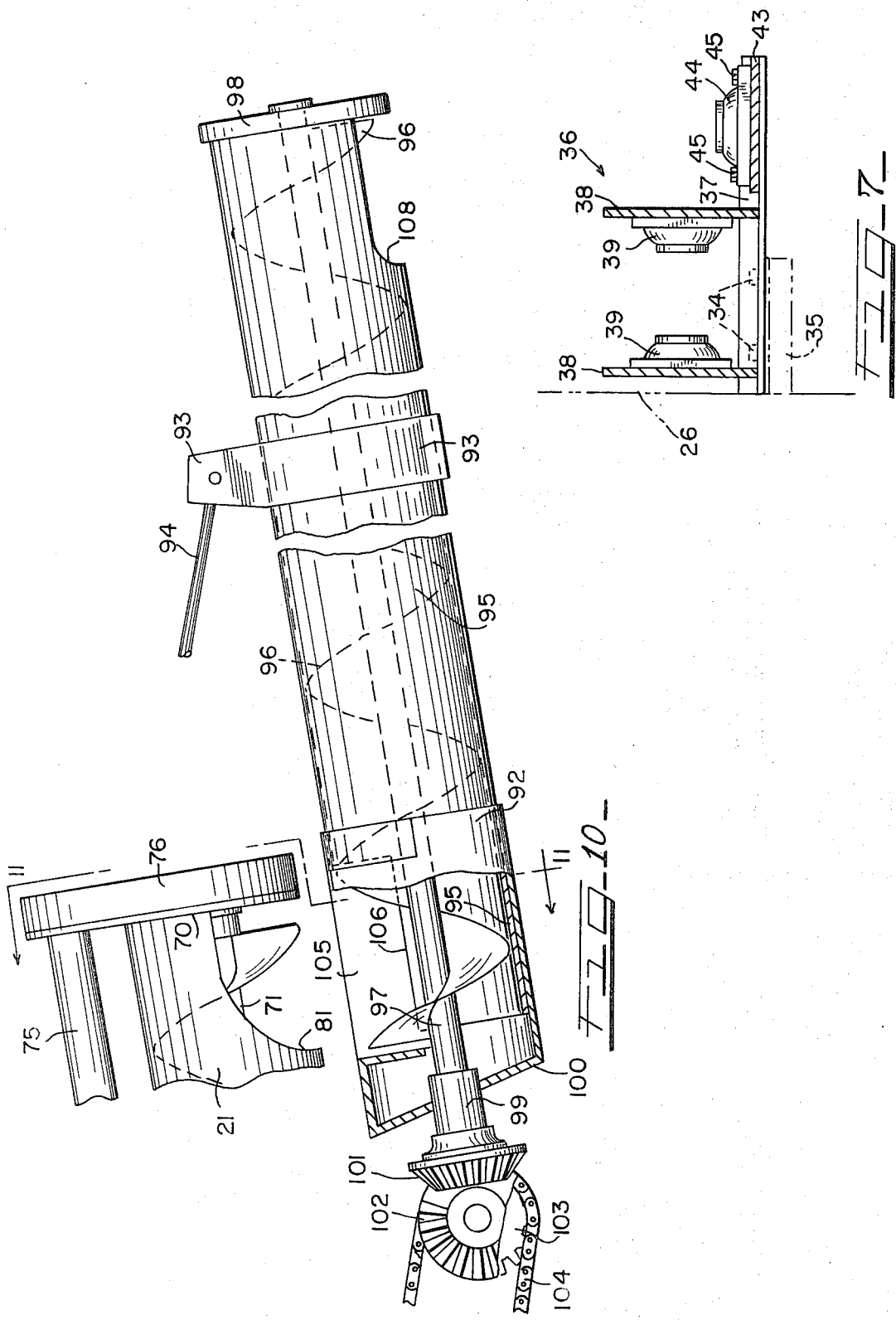

UNLOADER FOR THE GRAIN BIN OF A COMBINE

This invention relates to an unloader for the grain bin of a combine or the like.

Copending application of Bernard C. Mathews, Ser. No. 206,448, filed Dec. 9, 1971 discloses a combine having a grain bin located beneath the sieves, the grain bin being wider than the housing enclosing the sieves and having a top wall portion in the form of a ledge. A vertical auger conveyor extends upwardly from the bin through said ledge or top wall portion and has at its upper end a boom assembly which includes a substantially horizontally disposed auger conveyor. This boom type conveyor permits greater latitude in delivering the grain to a wagon located at one side of the combine.

The present invention is directed to said unloader. However, the present invention is also applicable to grain bins of the usual type in which the grain bin is located above the sieves and other mechanism of the combine.

One of the problems encountered in the design of a boom type unloader is that of arranging the auger drive mechanism so that the drive gears will not be in the path of the grain flow which would damage the grain, and possibly clog the gears.

According to my invention, I locate the gears outside and above the path of the grain.

The grain bin is not unloaded until it becomes filled. During operation of the unloader, there is a heavy flow of grain for a short period, such as three or four minutes.

Another problem encountered is that of making a smooth transition for this heavy flow of the grain at the point where the flow path changes from a vertical to a substantially horizontal direction. According to this aspect of my invention I provide a boom type conveyor assembly which includes a turret which is rotatably mounted on the pipe of the vertical auger and provides a chamber which evens out the irregularities in the feed rate of grain fed by the vertical auger to the end that the grain flow through the horizontal conveyor will be at a substantially uniform rate.

My invention also provides an improved arrangement which permits the boom type conveyor to be readily removed by a suitable hoist for inspection, repair, or replacement.

My invention also provides improved means for mounting and supporting the boom type conveyor.

My invention also provides an improved arrangement by means of which the grain bin can be unloaded into a trailing wagon when it becomes filled without further attention by the operator, to the end that the harvesting can be carried on by a single operator, the combine operating continuously for several fillings of its grain bin, until such time as both the trailing wagon and the grain bin have become filled, at which time the combine can tow the wagon back to the silo or other storage or delivery facility.

In the drawings:

FIG. 1 is an elevation of a combine showing my improved unloader with the extension being shown in broken lines;

FIG. 2 is a plan view taken along line 2—2 of FIG. 1, showing a portion of the auger drive means and also showing the swing actuator;

FIG. 3 is a side elevation of the unloader partially in section;

FIG. 4 is a vertical section taken at the bottom end of the vertical conveyor and within the grain bin;

FIG. 5 is an elevation showing the bracket for the tension member;

FIG. 6 is a plan view of the gear set mounting bracket;

FIG. 7 is a sectional elevation of the removable gear set base;

FIG. 10 is an elevation showing the unloader extension, a portion being shown in section;

Figure 11:
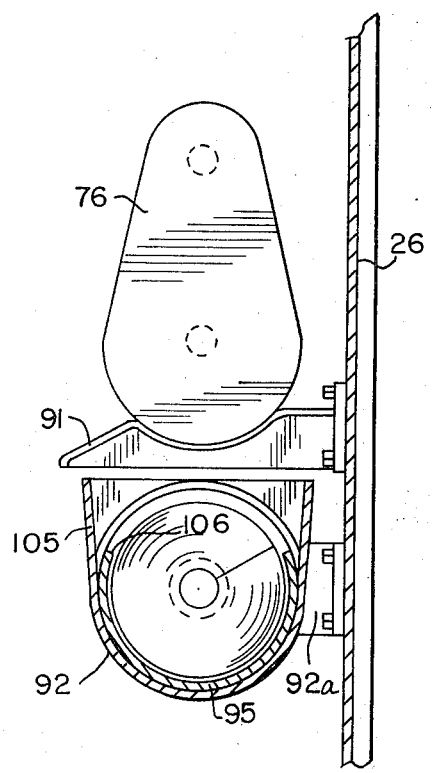
FIG. 11 is a section taken along line 11—11 of FIG. 10.

FIG. 1 shows a combine 10 having at its upper portion a casing 11 which contains the grain processing mechanism, and having at its lower portion a grain bin 12 which is sufficiently wider than the casing 11 so that there is a ledge extending outwardly from the body of the combine which provides a partial top wall 13 for the grain bin. The grain bin also has side walls 14 and sloping end walls 15 and a bottom wall 16. The combine shown for illustration of a preferred embodiment of my invention is the same as shown in the aforesaid copending application, to which reference is hereby made for further details as to the nature and construction of the combine.

Located along the bottom wall 16 are a pair of transverse augers 17 which feed the grain to that side of the bin 12 at which a vertical auger 19 is located. Shields 18 are disposed above the augers 17 to relieve the augers from the weight of the overlying grain, there being sufficient clearance between the lower edges of the shields and the bottom wall 16 to permit free entry of the grain into the augers 17.

The vertical auger 19 is located within a vertical pipe 20 which extends upwardly through the top wall 13, the pipe 20 being supported by the top wall 13 as will hereinafter be described so that it can be caused to terminate short of contact with the bottom wall 16 of the grain bin, as shown in FIG. 4.

FIG. 1 and 3 also show a boom assembly 21 which communicates with the vertical pipe 20 to receive grain therefrom and to deliver it to a wagon or the like. The boom assembly comprises a horizontal pipe 22 having an auger 23 located therein. A tension member 24 extends from a bracket 25, shown in FIG. 5, to a remote point of the pipe 22. The bracket 25 is removably mounted on a suitable structural member forming the side wall 26 of the casing 11 by bolts 25a. The boom assembly also includes a turret 27 which fits over the vertical pipe 20. The pipe 22 is inclined upwardly and outwardly from the horizontal by an angle of about 10° to 15°, although it may be greater or less, or it may be inclined either upwardly or downwardly in the case of a top bin combine arrangement. Since the purpose of the boom assembly is to convey the grain in a horizontal direction, the pipe 22 and the auger 23 are referred to herein as the "horizontal" pipe and the "horizontal" auger, even though they may be disposed at an angle to the horizontal which is considerably greater than that shown in the drawings. Driving means in the form of a gear set 28 are provided for driving the augers 19 and 23. The gear set will normally have a sheet metal enclosure, the drawings showing the gear set with the enclosing means removed. Shaft means extend between the gear set 28 and the outer end of the horizontal pipe 22, being shown as a propeller shaft 29 and a fixed axis shaft 30.

The arrangement for supporting the vertical pipe 20 and the augers 19 and 23 will now be described.

Figure 8:
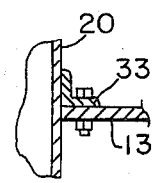
FIG. 8 is a fragmentary section showing the means for supporting the vertical pipe.

Vertical pipe 20 has a horizontal flange 33 thereon which engages the upper surface of the top wall 13 as shown in FIG. 8. Preferably the flange 33 is bolted to the top wall 13 in a manner which permits removal if necessary.

Affixed to a suitable structural member forming a part of the side wall 26 of the casing 11 are two mounting brackets 35, as shown in FIG. 6. The length of these brackets is such that they terminate just short of the upwardly projected surface of the turret 27 so as to permit the turret to be removed in the vertical direction. Firmly mounted on the brackets 35 by means of bolts 34 is the gear set base 36 which carries the various bearings, as shown in FIG. 7. The base 36 comprises two angles 37 which are spaced from each other by the same distance as the brackets 35 so that they may overlie same and be bolted thereto, the angles also being shown in FIG. 2. The angles support two vertical plates 38 each of which mounts a bearing 39 which are aligned with each other. As shown in FIG. 2, a power shaft 40 extends through the bearings 39 and carries a sprocket 41 at an intermediate point and a bevel drive pinion 42 at its outer end. Also mounted on the angles 37 is a horizontal plate 43 which carries a thrust bearing 44 for the upper end of the shaft 47 of the vertical auger 19. The thrust bearing 44 is secured to the plate 43 by suitable screws 45. To the upper end of the auger shaft 47 is secured a bevel gear 46 which has a shoulder portion adapted to engage the thrust bearing 44. The bevel gear 46 is driven by the bevel drive pinion 42.

The turret 27 comprises a cylindrical side wall 50 and a top wall 51, the latter having an opening therein to accommodate the shaft portion 47 of the auger 19. The turret also has an inner annular flange 52 which rests on an annular flange 53 at the upper edge of the vertical pipe 20 so that the turret may be rotatably supported on the pipe 20. The pipe 20 also has an aligning flange 54 which engages the inner surface of the lower end of the turret to stabilize same and to maintain the boom assembly upright when the tension member 24 is removed incident to disassembly. A clean-out door, not shown, is preferably provided in the side wall 50 of the turret.

On the upper surface of the top wall 51 there are located two angles 56 which serve as a support for a centering bearing 57, shown in FIG. 3. The bearing 57 is secured to the turret by suitable screws (not shown) taking into the angles 56.

An opening in the side cylindrical wall 50 accommodates the end of the horizontal pipe 22. Preferably the lower three-quarters of the pipe 22 is cut away so that it is approximately flush with the wall 20. The upper quarter of the pipe 22 however extends inwardly into the turret for a sufficient distance as to provide support for a front bearing 59 for the shaft 71 of horizontal auger 23.

The boom assembly 21, including the turret 27 and the horizontal pipe 22 is therefore supported at its inner end by the vertical pipe 20 and at its outer end by the tension member 24 which is connected to the horizontal pipe 22 by a sleeve mounted bracket 60, as shown in FIG. 3. The pivot pin 25b of the bracket 25 is preferably aligned with the vertical cylindrical axis 61 of the vertical pipe 20 to promote easy swinging movement of the boom assembly.

Figure 9:
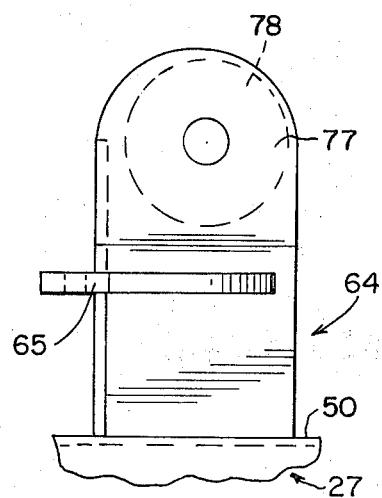
FIG. 9 is an elevation showing the shape of a certain bracket.

A swing actuator 62, shown in FIG. 2 is provided to swing the boom assembly out from its transport position shown, to a suitable position for delivery to a truck or wagon. A bracket 63 is secured to a structural portion of side wall 26, and another bracket 64 is mounted on the top wall 51 of the turret. As shown in FIG. 9, the bracket 64 has a horizontal plate portion 65. Links 66 and 67 connect bracket 63 and the plate 65. A double acting hydraulic cylinder 68 is connected between a bracket 69 on side wall 26 and the link 66. Operation of the hydraulic cylinder 68 will extend the linkage and cause the boom assembly 21 to swing away from the casing 11, and vice versa, the swinging movement being with respect to the vertical axis 61 which is common to the vertical pipe 20, the auger shaft 47, the centering bearing 57, and the bevel gear 46. Thus the meshed engagement of the pinion 80 and the bevel gear 46 is maintained for all angular positions of the boom assembly 21.

A plate 70 closes the outer end of the horizontal pipe 22, there being an outlet opening 81 on the under side of the pipe inwardly adjacent the plate 70. The shaft 71 of the auger 23 is journalled in plate 70 by a suitable bearing. The plate 70 also carries a bearing 72 for the outer end of the fixed axis shaft 30. A chain and sprocket drive 73 extends between the shaft 30 and the auger shaft 71.

A bearing 74 carried by the sleeve mounted bracket 60 receives the inner end of the shaft 30. The fixed axis shaft 30 is surrounded by a guard sleeve 75, and a housing 76 on plate 70 provides a guard for the chain and sprocket drive 73. The outlet 81 comprises an opening in the undersurface of the horizontal pipe 22 at a point adjacent said plate 70.

The bracket 64, as shown in FIGS. 9 and 3, includes a vertical transverse plate 77. A bearing 78 is carried by the plate 77. The propeller shaft 29 extends from the gear set 28 to the fixed axis shaft 30, being journalled at its inner end in bearing 78, and connected at its far end to shaft 30 by a suitable universal joint 79. The inner end of the propeller shaft 39 carries a bevel pinion 80 which meshes with the bevel gear 46. Thus a drive is established from the gear set 28 to the outer end of the auger 23, all driving mechanism being without the confines of the flow path of the grain from the turret to the outlet opening 81.

The drive gearing comprises the bevel drive pinion 42, the bevel gear 46, and the bevel pinion 80 which are all located outside of the flow path of the grain. The sprocket 41 is driven by a chain 82 from a suitable drive sprocket and clutch.

The boom assembly 21 may be removed from the combine by a suitable hoist. First, the bolts 34 are removed so that the gear set base 36 can be removed with the boom assembly 21. The link 67 of the swing actuator is then lifted off of the pin 65a. Hooks are inserted in an eye 83 secured to the turret 27 and an opening 84 in bracket 60 and the hoist chains (not shown) drawn taut. Then the tension member 24 is removed from the bracket 60 and the bolts 25a withdrawn so that the bracket 25 which overlies the turret 27 can be removed. Thereupon, operation of the hoist will elevate the boom assembly 21 and withdraw the vertical auger 19 from the vertical pipe 20. It will be noted that the lower end of the auger shaft 47 is hollow and fits loosely over a sealed ball bearing unit 85 (FIG. 4) supported on a standard 86 extending upwardly from the floor 16 of the bin 10. As a result the lower end of auger shaft 47 is free from the viewpoint of removal and replacement, but when in the operating position shown remains centered with respect to the vertical pipe 20. An access door, not shown, in the side wall 14 is provided to fit the shaft 47 over the bearing unit in replacement and for clean-out.

Thus, by detaching the gear set base 36 from the brackets 35 and the bracket 25 from the side wall 26, and by disconnecting the swing actuator 62, the boom assembly 21 can readily be removed for inspection and repair in case the augers 19, 23 become damaged or the pipes 20, 22 become clogged, and it may be replaced with equal facility.

For one-man operation with a trailer, a fixed extension conveyor 90 may be provided as optional equipment. In the transport position of the boom assembly 21, a saddle or support 91, (FIG. 11) mounted on the side wall 26, is provided to relieve the elements 24, 25 from stress incident to combine operation. The intended operation is that the unloader is inoperative until such time as the grain bin 12 becomes filled. Then a clutch is engaged to drive the chain 82 and sprocket 41 so that the grain bin 12 can be emptied into a truck or wagon located either at the side of the combine 10 or behind it.

Figure 12:
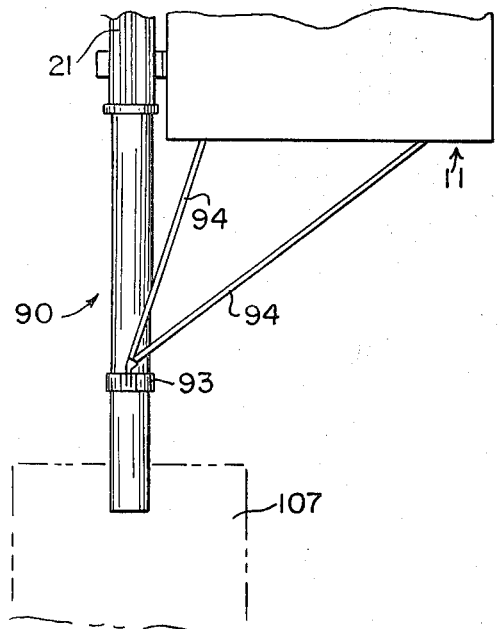
FIG. 12 is a plan view of the rear of the combine showing the unloader extension.

The extension conveyor 90 is supported at its front end by a closed end sleeve 92 including a mounting bracket 92a and toward its rear portion by a sleeve mounted bracket 93 similar to the sleeve mounted bracket 60. Rigid rods 94 (FIGS. 10 and 12) extend between the bracket 93 and a suitable structural portion of the casing 11 so that the extension conveyor 90 is a fixed axis conveyor, cooperating with the boom assembly 21 when in its transport position.

The extension conveyor 90 comprises a substantially horizontal conduit 95 having outlet 108 and an auger 96. The rear end of auger shaft 97 is journalled in end plate 98, and the front end in a bearing 99 mounted in the front wall 100 of closed end sleeve 92. Bevel gears 101, 102 drive the auger shaft 97 from a sprocket 103 and chain 104, the latter meshing with a suitable drive sprocket, not shown.

The closed sleeve 92 has a hopper portion 105 located beneath outlet 81. The conduit 95 terminates short of front wall 100 and is cut away as indicated by the edge 106 (FIG. 10) to receive grain from hopper portion 105. Thus, for one-man operation, the grain from bin 12 is conveyed through vertical pipe 20, horizontal conduit 22, and extension conveyor 90 to a trailer wagon 107.

In operation, the vertical auger 19 is driven at a rate such that the grain will be moved upward with the velocity sufficient as to maintain a body of grain more or less floating within the chamber provided by the turret 27. Thus the body of grain will tend to flow laterally so that a portion of the grain body will be engaged by the horizontal auger 23 and fed outwardly. There may be certain irregularities in the rate of vertical feeding due to agglomerations or packing at the bottom of the vertical pipe 20, or at the clearance between the shields 18 and the bin floor 16. Also the rate at which grain drops back through the clearance between the edge of auger 19 and the pipe 20 may vary, depending upon particle size and moisture content. As a result the vertical flow of grain may not be uniform from minute to minute. The turret chamber tends to even out these irregularities to the end that the grain flow through the horizontal duct 22 will be substantially uniform.

The vertical auger 18 may be a double helix auger, as indicated in FIG. 1, although only a single helix is shown in FIGS. 3 and 4 for clarity.

When loading a wagon or truck located at the side of the casing 11, either stationary or moving parallel with the combine, the boom assembly 21 after movement into delivery position can be swung back and forth to distribute the grain evenly in the receptacle of the wagon or truck as the bin 12 is being emptied. The swinging movement takes place easily and without binding because the whole boom assembly 21 is symmetrically arranged with respect to the common vertical plane which includes the axes of the auger shafts 47 and 71. Also the boom assembly is supported at two separate points: at its inner end by the vertical pipe 20, and at a remote point by the tension member 24, with the center of rotation of the latter being coincident with the axis 61 of the auger pipe 20.

The swinging movement of the boom assembly is preferably through an angle of 120°, and the bracket 64 is located so as to avoid interference with the gear set base 36.

The disclosure of aforesaid co-pending Application Ser. No. 206,448 is incorporated by reference into this application insofar as said disclosure is consistent with the teachings of this application.

Although only a preferred embodiment of my invention has been shown and illustrated herein, it will be understood that various modifications and changes can be made in the construction shown without departing from the spirit of my invention, as pointed out in the appended claims.

I claim:

1. An unloader for the grain bin of a combine having a casing, comprising a vertical auger conveyor, a boom assembly including a substantially horizontally disposed auger conveyor and a turret providing a connection with said vertical auger conveyor, said auger conveyors including first and second auger shafts respectively, said first auger shaft extending upwardly through and beyond said turret, shaft means disposed externally of said substantially horizontal auger conveyor and extending for substantially the full length thereof, means providing a driving connection between the remote end of said external shaft means and said second auger shaft, and bevel gear means located above said turret and connecting said first auger shaft and said external shaft means so that the driving mechanism for said second auger shaft is located externally of the path of the grain flow through said conveyors, said turret providing a chamber for receiving grain from said vertical auger conveyor, the axes of said first and second auger shafts being disposed in a common vertical plane so that grain elevated by said vertical auger conveyor into said turret can move directly into said horizontal auger conveyor.

2. An unloader as claimed in claim 1 in which said boom assembly is movable between a transport position in which it is disposed parallel to the side wall of said casing, and a delivery position in which it extends outwardly from said casing, a third auger conveyor disposed substantially horizontally and having its front end located to receive grain from said second mentioned auger conveyor when in its transport position, and having its rear end extending rearwardly beyond said casing for delivery of grain to a trailing wagon.

3. An unloader for the grain bin of a combine having a casing, comprising a vertical pipe having its lower end extending into said grain bin to receive grain therein, an auger within said pipe having an auger shaft, a boom assembly located at the upper end of said vertical pipe, said boom assembly comprising a turret located at the upper end of said vertical pipe and supported thereby, a second pipe disposed at an angle to said vertical pipe for conveying grain in a generally horizontal direction having an inner end communicating with said turret and an outlet at its outer end, a second auger located within said second pipe and having an auger shaft, and means for supporting the outer portion of said second pipe, drive means for said augers comprising shaft means disposed externally of said second pipe and extending for substantially the full length thereof, means providing a driving connection between the remote end of said external shaft means and said second auger shaft, said first auger shaft extending upwardly through and beyond said turret, a power shaft, and a gear set located above said turret and providing a driving connection between said power shaft and said vertical auger shaft and said external shaft means, said turret providing a chamber for receiving grain from said vertical auger, and said second auger removing from said chamber the grain supplied by said vertical auger, the axes of said first and second auger shafts being disposed in a common vertical plane so that said grain moves directly from said chamber into said second pipe.

4. An unloader as claimed in claim 3 in which said turret is rotatably mounted on said vertical pipe, said outer pipe portion supporting means comprising a bracket removably mounted on said casing and having a pivot, a bracket secured to the outer portion of said second pipe, and a tension member extending between said pipe bracket and said pivot, said pivot being aligned with the axis of said vertical auger whereby said boom assembly is rotatably mounted with respect to the vertical axis of said vertical auger.

5. An unloader as claimed in claim 3 in which said boom assembly is rotatably mounted, link means connecting said casing and said boom assembly, and a hydraulic cylinder extending between said casing and said link means for swinging said boom assembly toward and away from said casing.

6. An unloader as claimed in claim 3 which includes a plate mounted at the outer end of said second pipe and closing the end thereof, a bearing mounted in said plate for the outer end of said second auger, said means providing a driving connection between the remote end of said shaft means and said auger shaft comprising chain and sprocket means mounted on said plate, said outlet comprising an opening in the undersurface of said second pipe adjoint to said plate.

7. An unloader for the grain bin of a combine having a casing, comprising a vertical pipe having its lower end extending into said grain bin to receive grain therein, an auger within said pipe having an auger shaft, a boom assembly located at the upper end of said vertical pipe, said boom assembly comprising a turret located at the upper end of said vertical pipe and supported thereby, a second pipe disposed at an angle to said vertical pipe for conveying grain in a generally horizontal direction having an inner end communicating with said turret and an outlet at its outer end, a second auger located within said second pipe and having an auger shaft, and means for supporting the outer portion of said second pipe, drive means for said augers comprising shaft means disposed externally of said second pipe and extending for substantially the full length thereof, means providing a driving connection between the remote end of said external shaft means and said second auger shaft, said first auger shaft extending upwardly through and beyond said turret, a power shaft, a gear set located above said turret and providing a driving connection between said power shaft and said vertical auger shaft and said external shaft means, said turret providing a chamber for receiving grain from said vertical auger, and said second auger removing from said chamber the grain supplied by said vertical auger, said boom assembly being rotatably mounted, bracket means secured to said casing and having their outer ends terminating short of said turret, said gear set having a base secured to said brackets, bearing means for said power shaft mounted on said base, a first bevel gear secured to said power shaft, a second bevel gear secured to said vertical auger shaft and meshing with said first bevel gear, said external shaft means including a propeller shaft, bearing means for the inner end of said propeller shaft, said bearing means being mounted on said turret, a third bevel gear secured to said propeller shaft and meshing with said second bevel gear whereby the angular movement of said boom assembly is concentric with the axis of said second bevel gear so that the meshed relationship of said second and third bevel gears is maintained for different angular positions of said boom assembly.

8. An unloader as claimed in claim 7 in which said base is removably secured to said brackets, whereby said boom assembly, said vertical auger, and said gear set may be elevated so that the vertical auger is removed from said vertical pipe.

9. An unloader for the grain bin of a combine having a casing, comprising a vertical pipe having its lower end extending into said grain bin to receive grain therein, an auger within said pipe having an auger shaft, a boom assembly located at the upper end of said vertical pipe, said boom assembly comprising a turret located at the upper end of said vertical pipe and supported thereby, a second pipe disposed at an angle to said vertical pipe for conveying grain in a generally horizontal direction having an inner end communicating with said turret and an outlet at its outer end, a second auger located within said second pipe and having an auger shaft, and means for supporting the outer portion of said second pipe, drive means for said augers comprising shaft means disposed externally of said second pipe and extending for substantially the full length thereof, means providing a driving connection between the remote end of said external shaft means and said second auger shaft, said first auger shaft extending upwardly through and beyond said turret, a power shaft, a gear set located above said turret and providing a driving connection between said power shaft and said vertical auger shaft and said external shaft means, said turret providing a chamber for receiving grain from said vertical auger, and said second auger removing from said chamber the grain supplied by said vertical auger, a plate mounted at the outer end of said second pipe and closing the end thereof, a bearing mounted in said plate for the outer end of said second auger, said means providing a driving connection between the remote end of said shaft means and said auger shaft comprising chain and sprocket means mounted on said plate, said outlet comprising an opening in the undersurface of said second pipe adjoint to said plate, said shaft means comprising a propeller shaft and a fixed axis shaft, universal joint means connecting said propeller shaft and said fixed axis shaft, a bracket secured to said second pipe toward the outer end thereof, bearing means carried by said bracket, the inner end of said fixed axis shaft being journalled in said bearing means, and a bracket mounted on said turret and carrying a second bearing, the inner end of said propeller shaft being journalled in said second bearing, and the outer end being supported by said universal joint means.

10. An unloader for the grain bin of a combine having a casing, comprising a vertical pipe having its lower end extending into said grain bin to receive grain therein, an auger within said pipe having an auger shaft, a boom assembly located at the upper end of said vertical pipe, said boom assembly comprising a turret rotatably mounted on the upper end of said vertical pipe and supported thereby, a second pipe disposed at an angle to said vertical pipe for conveying grain in a generally horizontal direction and having an inner end communicating with said turret, a second auger located within said second pipe and having an auger shaft, and swinging support means for supporting the outer portion of said second pipe, shaft means disposed externally of said second pipe and extending for substantially the full length thereof, means providing a driving connection between the remote end of said external shaft means and said second-mentioned auger shaft, said first auger shaft extending upwardly through and beyond said turret, said external shaft means and said first-mentioned auger shaft being arranged with intersecting axes, and bevel gear means connecting the upper end of said first auger shaft and the inner end of said external shaft means whereby the meshed relationship of said bevel gear means is maintained for different angular positions of said boom assembly, the vertical axes of said vertical pipe, said first auger shaft, and said swinging support means being substantially coincident with each other to permit swinging movement of said boom assembly toward and away from said casing.

* * * * *